United States Patent
McEwen et al.

(10) Patent No.: US 7,228,480 B1
(45) Date of Patent: *Jun. 5, 2007

(54) RATE-1 CODING FOR INCREASING TIMING INFORMATION IN RECORDING DATA

(75) Inventors: Peter McEwen, deceased, late of Porter, TX (US); by John McEwen, legal representative, Porter, TX (US); Ara Patapoutian, Westborough, MA (US); Bernie Rub, Sudbury, MA (US)

(73) Assignee: Maxtor Corporation, Scotts Valley, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 10/315,909

(22) Filed: Dec. 10, 2002

Related U.S. Application Data

(60) Provisional application No. 60/339,265, filed on Dec. 11, 2001.

(51) Int. Cl.
*G06F 11/00* (2006.01)
*H03M 7/00* (2006.01)

(52) U.S. Cl. .................. 714/746; 714/701; 341/59
(58) Field of Classification Search ............... 714/746, 714/774, 764, 752, 759, 769
See application file for complete search history.

(56) References Cited

U.S. PATENT DOCUMENTS

| | | | | |
|---|---|---|---|---|
| 3,905,029 | A | * | 9/1975 | McIntosh ................ 341/69 |
| 4,993,029 | A | * | 2/1991 | Galbraith et al. ........ 714/769 |
| 5,760,717 | A | | 6/1998 | Scholz ................... 341/59 |
| 5,784,010 | A | * | 7/1998 | Coker et al. ............ 341/61 |
| 6,177,890 | B1 | | 1/2001 | Keirn et al. ............ 341/59 |
| 6,229,459 | B1 | | 5/2001 | Noda .................... 341/59 |
| 6,314,534 | B1 | | 11/2001 | Agrawal et al. .......... 714/702 |
| 6,557,124 | B1 | * | 4/2003 | Cideciyan et al. ........ 714/701 |
| 6,587,977 | B1 | * | 7/2003 | Riggle et al. ........... 714/701 |

* cited by examiner

*Primary Examiner*—Phung My Chung
(74) *Attorney, Agent, or Firm*—Tejpal S. Hansra

(57) ABSTRACT

A method for encoding a bit stream to meet a minimum bit transition requirement includes providing uncoded bits, determining whether the uncoded bits meet the minimum bit transition requirement, and replacing selected bits in the uncoded bits with replacement bits that meet the minimum bit transition requirement if the uncoded bits do not meet the minimum bit transition requirement, thereby encoding the uncoded bits into encoded bits that meet the minimum bit transition requirement.

120 Claims, 6 Drawing Sheets

US 7,228,480 B1

RATE-1 CODING FOR INCREASING TIMING INFORMATION IN RECORDING DATA

RELATED APPLICATION

This application claims priority from U.S. Provisional Application Ser. No. 60/339,265 entitled "A Rate-1 Code Approach That Maximizes Timing Information" filed on Dec. 11, 2001 which is incorporated herein by reference.

FIELD OF THE INVENTION

The present invention relates to recording data in data storage devices, and more particularly, to encoding data with additional timing information.

BACKGROUND OF THE INVENTION

FIG. 1 illustrates a conventional disk drive 100. The disk drive 100 performs data storage and retrieval functions for an external host computer 102. The disk drive 100 includes a disk 104, a transducer 106, an actuator assembly 108, a voice coil motor (VCM) 110, a read/write channel 112, an encoder/decoder (ENDEC) 114, an error correction code (ECC) unit 116, a data buffer 118, an interface 120, a servo unit 122 and a disk controller 124.

The disk 104 includes one or two disk surfaces (not shown) which are coated with magnetic material capable of changing its magnetic orientation in response to an applied magnetic field. Data is stored digitally in magnetic-polarity transitions (frequently referred to as pulses in cells) within concentric tracks on the disk surface(s). The disk 104 is rotated at a substantially constant spin rate by a spin motor (not shown) that is speed-controlled by a closed-loop feedback system. Instead of the single disk 104, the disk drive 100 can include multiple disks 104 each mounted on a single spindle and serviced by one or more separate transducers 106.

The transducer 106 transfers information to and from the disk 104 during read and write operations. The transducer 106 is positioned over the disk 104 by the actuator assembly 108 that pivots about an axis under the power of the VCM 110. During a write operation, a polarity-switchable write current is delivered to the transducer 106 from the channel 112 to induce magnetic-polarity transitions onto a desired track of the disk 104. During a read operation, the transducer 106 senses magnetic-polarity transitions on a desired track of the disk 104 to create an analog read signal that is indicative of the data stored thereon. The transducer 106 is commonly a dual element head having a magneto-resistive read element and an inductive write element.

The VCM 110 receives movement commands from the servo unit 122 for properly positioning the transducer 106 above a desired track of the disk 104 during read and write operations. The servo unit 122 is part of a servo loop that uses servo information from the disk 104 to control the movement of the transducer 106 and the actuator assembly 108 in response to commands from the disk controller 124.

During a read operation, the channel 112 receives the read signal from the transducer 106 and processes the read signal to create digital data representative of the data stored on the disk 104. The channel 112 includes detection circuitry and a read clock for deriving timing information from the read signal.

The ENDEC 114 encodes data transferred from the host computer 102 to the disk 104, and decodes data transferred from the disk 104 to the host computer 102. Data written to the disk 104 is encoded for a number of reasons, including timing and detection. The ENDEC 114 imparts a run length limited (RLL) code on data written to the disk 104 to ensure that the transition frequency in the bit stream does not exceed or fall below predetermined limits. RLL coding ensures that enough transitions exist in the read data to maintain an accurate read clock.

The ECC unit 116 adds redundant information to user data from the host computer 102 before the data is encoded by the ENDEC 114 and written to the disk 104. The redundant information is used during subsequent read operations to discover error locations and values in the decoded read data. Read data errors can result from (1) noise from disk defects, (2) random noise from the transducer, cabling and electronics, (3) poor transducer placement reducing signal amplitude and/or increasing adjacent track noise during the read operation, (4) poorly written data due to disk defects or poor transducer placement, (5) foreign matter on the disk, and (6) disk damage. The ECC unit 16 corrects up to a predetermined number of errors in a data block (sector). If more than the predetermined number of errors exist, then the ECC unit 16 will not correct the errors but may still identify that errors exist within the data block. The ECC functionality is implemented by hardware and software.

The data buffer 118 temporarily stores data (1) to permit different data rates between the disk drive 100 and the interface bus between the disk drive 100 and the host computer 102, (2) to allow the ECC unit 116 to correct data errors before the data is sent to the host computer 102, (3) for temporary parameter storage for the disk controller 124, and (4) for data caching.

The interface 120 establishes and maintains communication between the disk drive 100 and the host computer 102. The transfer of information into and out of the disk drive 100 takes place through the interface 120.

The disk controller 124 is a microprocessor that controls the operation and timing of other components in the disk drive 100. In addition, the disk controller 124 may perform the functions of some of these components. For example, the disk controller 124 may perform the correction computation of the ECC unit 116 if the errors exceed the capability of the ECC unit 116.

Disk drive encoding and decoding schemes have drawbacks. Clock information is embedded in data stored on the disk 104, and detected data includes clock phase error information that the channel 112 uses for clock extraction. RLL codes ensure adequate and timely clock information for clock extraction.

RLL codes are d,k codes, where d is the minimum run length between magnetic-polarity transitions and k is the maximum run length between magnetic-polarity transitions. The d,k codes are also the minimum and maximum number of 0's between two 1's, respectively. Data representation conventions include NRZ (non-return to zero) and NRZI (non-return to zero, change on ones). With NRZ, a magnetic-polarity transition occurs when a sequence (one or more) of 0's changes to a sequence of 1's, or vice-versa. With NRZI, d,k becomes (d+1,k+1), a magnetic-polarity transition occurs each time a 1 appears and 0's appear otherwise. While either convention is acceptable and supported by the present invention, NRZ will be illustrated below. Under either convention, d is the minimum number of bits that must exist between magnetic-polarity transitions, and k is the maximum number bits that may exist between magnetic-polarity transitions. The constraint d controls pulse crowding effects, and the constraint k ensures clock extraction and to facilitate error event length control in certain sequence detectors. Viterbi detectors and the like usually permit the minimum run length constraint d to be 0.

ENDEC 114 implements RLL code by logically complete, immutable and unambiguous mapping between uncoded symbols (data symbols and ECC symbols) and encoded symbols (to be stored on the disk) to ensure that the encoded symbols meet the run length constraints. The encoded symbols include more bits than the uncoded symbols because symbols (words) that do not satisfy the run length constraints are discarded.

The number of bits in the uncoded symbol is M, and the number of bits in the encoded symbol is N. The code rate M/N is less than one in conventional systems. Encoders exhibiting code rates of 8/9, 16/17 and 24/25 are typical for disk drives.

With a code rate of 8/9, one of $2^{8=256}$ possible uncoded symbols may be mapped to one of $2^{9=512}$ possible encoded symbols. However, of the 512 possible encoded symbols, those symbols that fail to meet the run length constraints (and other excess symbols) are discarded, and only 256 of the 512 possible encoded symbols are used.

Because encoding requires uncoded symbols with M bits to be mapped to encoded symbols with N bits, overhead is added to the disk drive 100. For example, with an 8/9 code rate, ⅑th of the user data space on the disk 104 is occupied by unproductive overhead. Similarly, for a 24/25 code rate, ½₅th of the user data space on the disk 104 is occupied by unproductive overhead. To minimize RLL code overhead, encoders have been designed with higher code rates which implies larger M and N values so that the code rate asymptotically approaches, but never reaches, the value 1 (zero code overhead).

However, increasing M and N to achieve higher code rates also increases decoder error propagation that degrades ECC performance. When errors occur in detecting the encoded symbols, errors increase from mapping the encoded symbols to uncoded symbols because any one encoded error bit may map to one or more decoded error bits, and thus to multiple uncoded symbols recognized by the ECC unit 116. There is a strong correlation between error propagation and the size of M and N. The larger M and N are, the greater the average error propagation seen by the ECC unit 116.

More ECC symbols compensate for increased error propagation. However, more ECC symbols create more ECC overhead, thereby lowering the ECC code rate defined as data symbols/(data symbols+ECC symbols). Decreasing the ECC code rate also degrades the combined code rate defined as RLL code rate×ECC code rate. Thus, increasing M and N eventually decreases the combined code rate.

Further, if M is not an exact multiple of the ECC symbol size, or if the ECC symbols and the uncoded symbols do not share the same boundaries whenever possible, then additional error propagation occurs because certain uncoded symbol errors may affect more symbols than necessary due to poor mapping.

Large M and N also degrade format efficiency due to inflexible sector sizes. Format efficiency is greatest when the sum of data bytes, CRC bytes, and ECC bytes is an exact multiple of M. However, as M becomes larger, format efficiency suffers which creates problems similar to increased code overhead.

Concatenated recording codes provide both run length constraints and redundancy information (parity codes, turbo codes, etc.). The redundancy information permits signal extraction at reasonable error rates despite poor signal-to-noise ratios. However, the run length constraints may limit the redundancy information.

Accordingly, there is a need for improved encoding and decoding of data to be recorded in a data storage device.

SUMMARY OF THE INVENTION

The present invention addresses the above needs.

A method for encoding a bit stream to meet a minimum bit transition requirement includes providing uncoded bits, determining whether the uncoded bits meet the minimum bit transition requirement, and replacing selected bits in the uncoded bits with replacement bits that meet the minimum bit transition requirement if the uncoded bits do not meet the minimum bit transition requirement, thereby encoding the uncoded bits into encoded bits that meet the minimum bit transition requirement.

The method includes determining whether the uncoded bits meet the minimum bit transition requirement even though the uncoded bits have a common value that exceeds a maximum run length limitation, and maintaining the uncoded bits if the uncoded bits meet the minimum bit transition requirement even though the uncoded bits have a common value that exceeds the maximum run length limitation.

The method includes storing the encoded bits as magnetic-polarity transitions on a disk, then reading the magnetic-polarity transitions to retrieve the encoded bits, then replacing the replacement bits in the encoded bits read from the disk with the selected bits based on an ECC computation performed on the encoded bits, thereby decoding the encoded bits into the uncoded bits, and then sending data bits in the uncoded bits to a host computer.

The present invention eliminates conventional RLL code and enhances timing information in the encoded bits. The timing information is used by a timing loop to phase lock on the encoded bits. Rather than using a run length constraint, the replacement bits provide intentionally-introduced errors to enhance timing information. The encoded bits are recorded, and after reading the encoded bits with the enhanced timing information, an ECC unit corrects the errors.

In a preferred implementation, the replacement bits invert at least two of the selected bits, and the selected bits and the replacement bits have the same bit length which is less than the bit length of the uncoded bits. Furthermore, the timing information is a function of the slopes squared of waveforms based on bit transitions in sets of the uncoded bits, and the sets are designated by a sliding window. Moreover, profiling provides more timing information where it is more important, for example at the beginning of a data block.

Other objects, features and advantages of the invention will be apparent from the following detailed description taken in conjunction with the following drawings.

DETAILED DESCRIPTION OF THE INVENTION

While the present invention is susceptible of embodiments in many different forms, preferred embodiments of the present invention are set forth herein with the understanding that the preferred embodiments are an exemplification of the present invention and are not intended to limit the broad aspects of the present invention.

Figure 1:
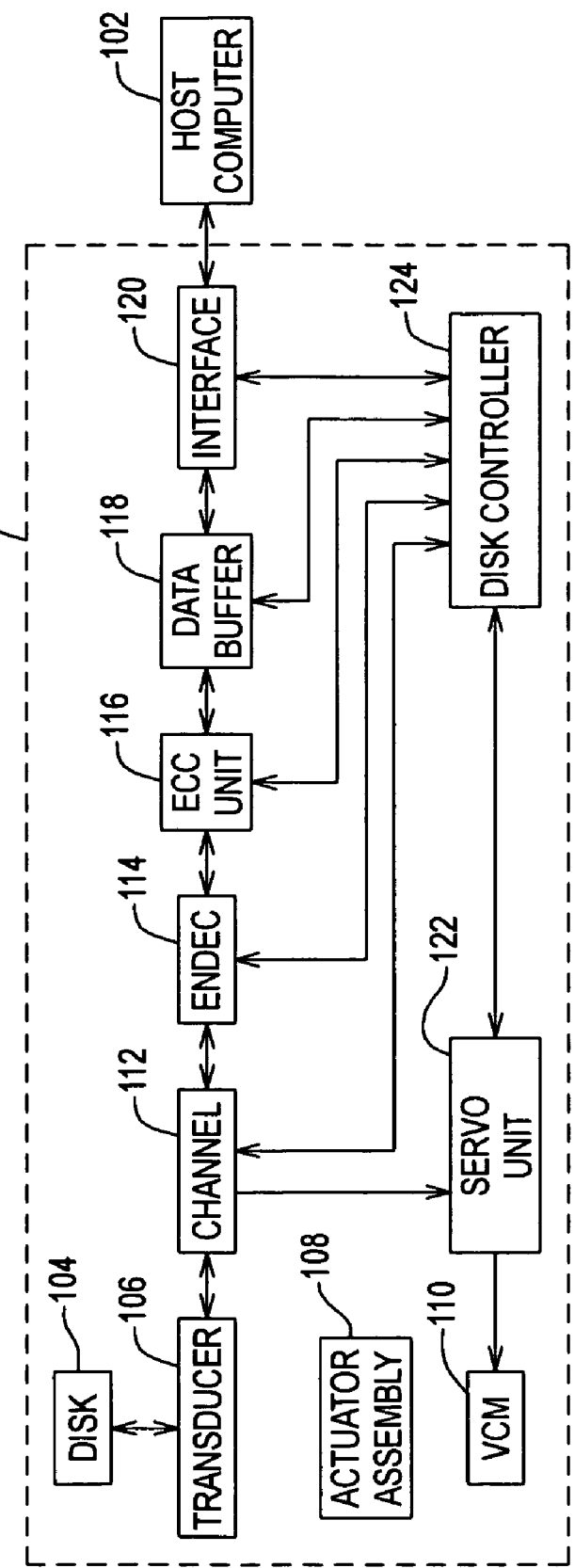
FIG. 1 shows a disk drive coupled to a host computer.
Figure 2:
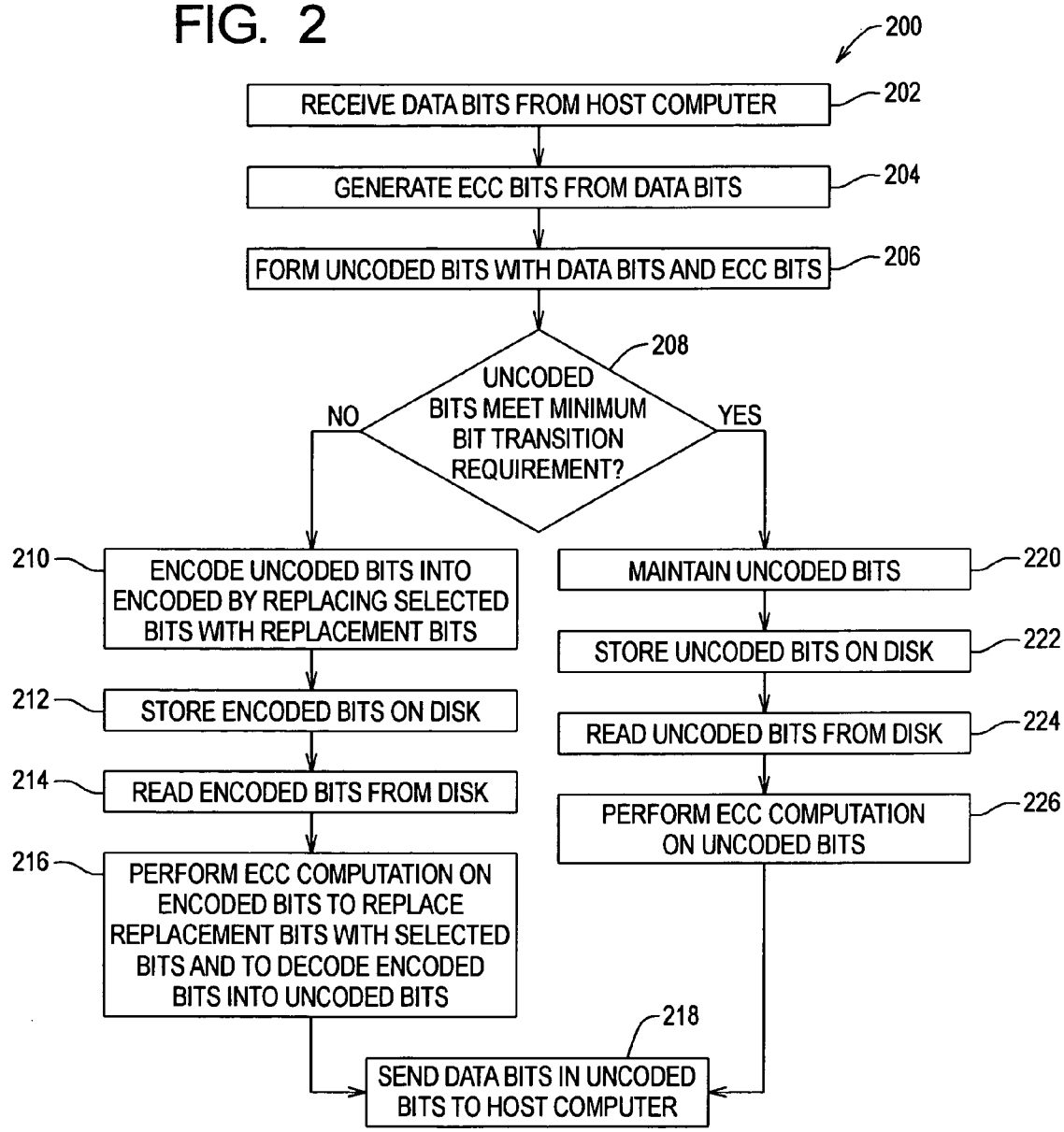
FIG. 2 shows a flowchart for encoding and decoding a bit stream.

FIG. 2 shows a flowchart 200 for encoding and decoding a bit stream in accordance with the present invention. The encoding and decoding are implemented by the disk drive 100.

Incoming data bits (user data) sent from the host computer 102 are received by the disk drive 100 (step 202). The data bits are arranged as data symbols and each data symbol contains ten consecutive data bits. ECC bits (redundancy data) are generated by performing an ECC computation on the data bits (step 204). The ECC bits are arranged as ECC symbols and each ECC symbol contains ten consecutive ECC bits. Uncoded bits are provided by the data bits and the ECC bits (step 206). The uncoded bits have a bit length L of one-hundred and therefore are provided by one-hundred data bits and ECC bits, and likewise, ten symbols provided by the data symbols and the ECC symbols.

The uncoded bits are analyzed to determine whether the uncoded bits meet a minimum bit transition requirement (step 208). The minimum bit transition requirement indicates whether the uncoded bits have sufficient timing information for a timing loop (such as a digital phase lock loop) to phase lock on the uncoded bits when the uncoded bits are subsequently read from the disk 104. The timing loop phase locks on the bits being read to synchronize an analog-to-digital converter that samples the read signal at intervals of one cell. The timing loop needs sufficient timing information for reliable recovery of the data bits.

A bit transition is a 0 followed by a 1, or a 1 followed by a 0. For example, the data symbol 0111111110 contains two bit transitions, the data symbol 0001111001 contains three bit transitions, and the data symbol 1010100000 contains five bit transitions.

Bit transitions provide a waveform with high slopes at the signal shoulders, which provides good timing information for phase locking. Thus, the timing information is a function of the slope of a waveform based on the bit transitions in the uncoded bits. For example, a bit stream of consecutive 0's or 1's has no bit transitions and therefore the waveform is not changing, there is no slope and little or no timing information. A bit stream with more bit transitions may provide sufficient timing information. However, if the bit stream has too many bit transitions, the slope of the waveform may degrade due to inter-symbol interference.

If the uncoded bits do not meet the bit transition requirement, the uncoded bits are encoded into encoded bits by replacing selected bits in the uncoded bits with replacement bits (step 210). The replacement bits meet the minimum bit transition requirement, and as a result, the encoded bits meet the minimum bit transition requirement. In other words, the replacement bits increase the timing information in the uncoded bits so that the encoded bits have sufficient timing information for the timing loop to phase lock on the encoded bits as the encoded bits are subsequently read from the disk 104.

The replacement bits are arranged as a replacement symbol that contains ten consecutive replacement bits. The selected bits are a symbol selected from the data symbols and the ECC symbols in the uncoded bits. Thus, the replacement symbol replaces the selected symbol, and the selected symbol is one of the data symbols or the ECC symbols. The selected symbol can be a data symbol or an ECC symbol, depending on which symbol is selected to be replaced. Furthermore, the selected symbol and the replacement symbol each have a bit length of ten, which is substantially less than the uncoded bits bit length of one-hundred.

The replacement bits inject intentionally-introduced errors into the uncoded bits that increase the timing information in the uncoded bits (or the encoded bits after the errors are injected). Thus, if the uncoded bits have inadequate timing information then errors are introduced into the uncoded bits to enhance timing information.

Advantageously, the uncoded bits are not converted into RLL code to provide sufficient timing information, as is conventional. Instead, the replacement bits inject errors into the uncoded bits to provide sufficient timing information. As a result, the uncoded bits and the encoded bits need not meet a maximum run length limitation. Moreover, since the replacement bits have the same bit length as the selected bits, RLL code disadvantages such as increased overhead, error propagation and complexity are avoided.

The replacement bits invert at least two of the selected bits to inject the errors. For example, the replacement symbol 1010101000 inverts two bits of the selected symbol 1010000000, three bits of the selected symbol 1000000000 and five bits of the selected symbol 1111111110. The replacement bits can replace selected bits that have insufficient timing information. For example, the replacement symbol 0011001100 can replace the data symbol 0000000000. Alternatively, the replacement bits can replace selected bits that fall in the middle or elsewhere within the uncoded bits, regardless of whether particular uncoded bits have insufficient timing information. The replacement bits can be predetermined, such as 0011001100 or 1100110011, and not based on the uncoded bits. Alternatively, the replacement bits can be determined by a waveform based on the uncoded bits.

The encoded bits are stored on the disk 104 by the transducer 106 writing the encoded bits as magnetic-polarity transitions on the disk 104 (step 212). Thereafter, the encoded bits are retrieved form the disk 104 by the transducer 106 reading the magnetic-polarity transitions from the disk 104 (step 214). The increased timing information in the encoded bits due to the replacement bits ensures that the timing loop phase locks on the encoded bits as the encoded bits are read from the disk 104.

The encoded bits read from the disk 104 are decoded into the uncoded bits by performing an ECC computation on the encoded bits to generate the selected bits and then replacing the replacement bits with the generated selected bits (step 216). The ECC computation uses Reed-Solomon code to detect and correct the replacement symbol, thereby restoring the selected symbol regardless of how many errors the replacement symbol injects. Thus, the ECC computation corrects the errors so that the encoded bits are converted into the uncoded bits. Advantageously, since the uncoded bits are only slightly changed by the replacement bits, and few data blocks contain the replacement bits, the replacement bits have a negligible effect on data reliability.

The data bits in the decoded uncoded bits are then sent from the disk drive 100 to the host computer 102 (step 218).

Returning to step 208, if the uncoded bits meet the bit transition requirement then the uncoded bits are maintained (step 220). The uncoded bits are maintained and remain unchanged regardless of whether they meet the maximum run length limitation since they meet the minimum bit transition requirement and therefore have sufficient timing information for the timing loop to phase lock on them during a subsequent read operation. The uncoded bits are stored on the disk 104 (step 222), retrieved from the disk 104 (step 224), subject to an ECC computation (step 226) and then the data bits in the uncoded bits are sent to the host computer 102 (step 218).

Thus, the data bits are returned to the host computer 102 regardless of whether the uncoded bits have sufficient timing information.

Figure 3:
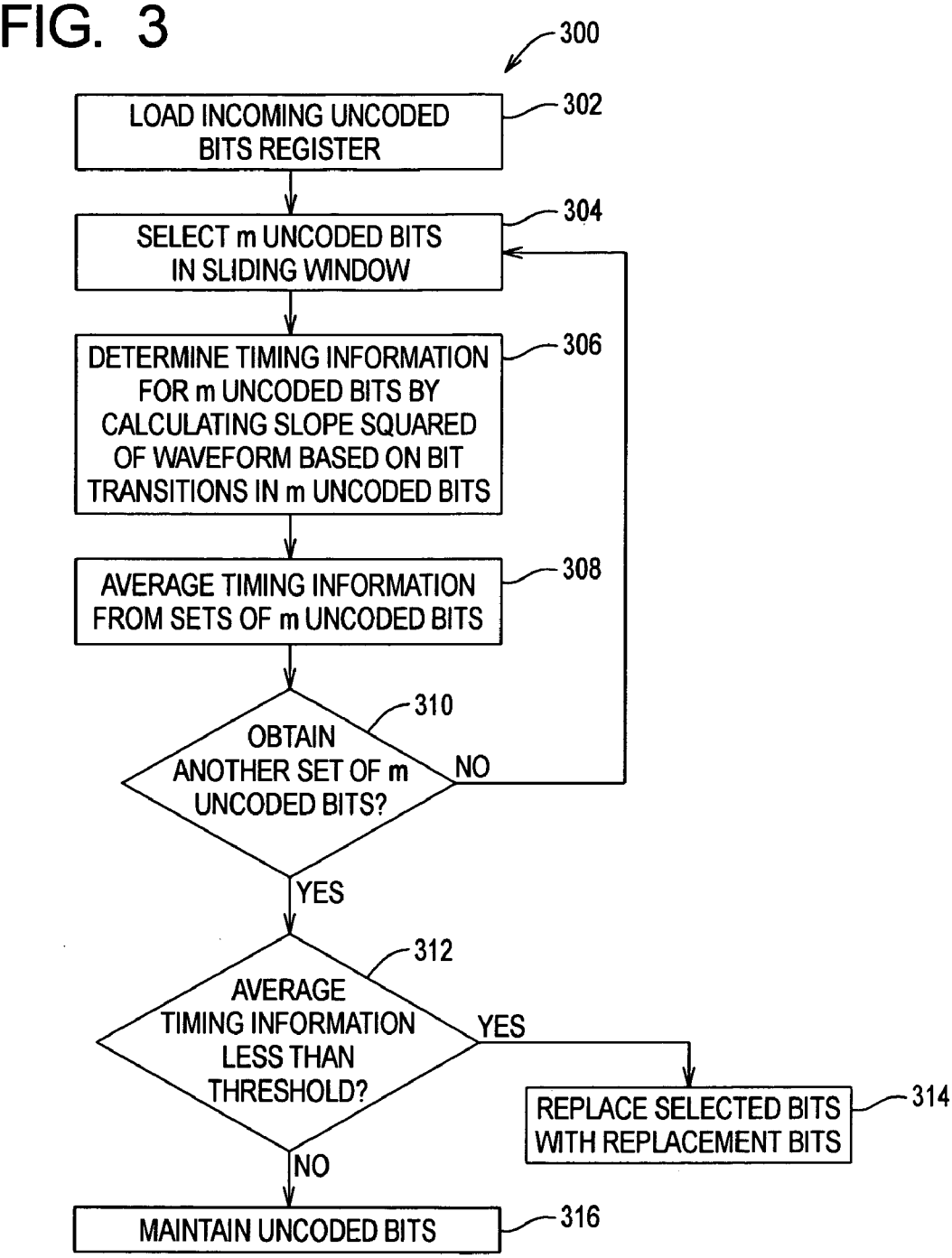
FIG. 3 shows a flowchart for encoding uncoded bits as a function of the slopes squared of waveforms based on bit transitions in the uncoded bits.

FIG. 3 shows a flowchart 300 for encoding the uncoded bits as a function of the slopes squared of waveforms based on the bit transitions in the uncoded bits.

The incoming uncoded bits are loaded into a bit register (step 302). A sliding (moving) window selects m uncoded bits in the bit register (step 304). The sliding window designates m uncoded bits at a time and generates unique sets of m uncoded bits. In this example, the uncoded bits and the bit register have a bit length of one-hundred, the sliding window has a bit length of six and m is six.

Timing information for the m uncoded bits designated by the sliding window is determined by calculating the slope squared of a waveform based on the bit transitions in the m uncoded bits (step 306). In one approach, the waveform is generated by convolving the m uncoded bits with a partial response target, the slope of the waveform is determined by differentiating the waveform to obtain the first derivative of the waveform, and the slope squared is determined by squaring the slope. In another approach, which is conducive to symbol rate operation, a look-up table generated from the partial response target provides a corresponding slope squared for each m uncoded bit sequence. For example, with bit-rate operation, the look-up table receives ten input bits, a five bit overlap occurs between successive look-ups by shifting the look-up table access by five bits at a time, and the look-up table generates the slope squared as a two bit value, or alternatively, the look-up table output is quantized to two levels indicating sufficient timing information or lack thereof.

Once the timing information for the m uncoded bits is obtained, the timing information is averaged with timing information obtained from previous sets of m uncoded bits (step 308). Thus, the timing information for sets of m uncoded bits is averaged. It is next determined whether another set of m uncoded bits can be obtained (step 310). If so, another m uncoded bits are selected (step 304), timing information for the m uncoded bits is obtained (step 306) and it is determined whether another set of m uncoded bits can be obtained (step 308). In this manner, steps 304 to 308 are repeated until the sliding window obtains the last set of m uncoded bits.

Once the average timing information for the sets of m uncoded bits including the last set of m uncoded bits has been obtained, it is determined whether the average timing information is less than a threshold based on the minimum bit transition requirement (step 312). If so, the replacement bits replace the selected bits (step 314), otherwise the uncoded bits are maintained (step 316).

Figure 4:
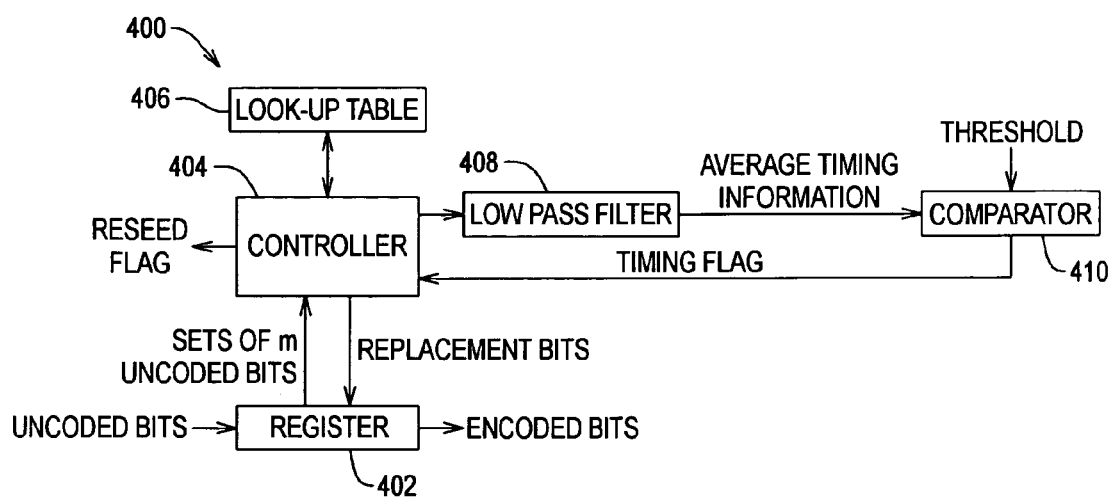
FIG. 4 shows an encoder for FIG. 3.

FIG. 4 shows an encoder 400 that implements the flowchart 300.

The encoder 400 includes a register 402, a controller 404, a look-up table 406, a low pass filter 408 and a comparator 410. The register 402 has a bit length L of one-hundred, and the uncoded bits are loaded into the register 402 m uncoded bits at a time. The controller 404 determines the waveform representing the m uncoded bits using the m uncoded bits and the partial response target, and the controller 404 determines the timing information for the waveform using the look-up table 406. Alternatively, the controller 404 includes logic to differentiate the waveform to determine the slope and then square the slope to obtain the slope squared for the waveform. In either case, the controller 404 determines the timing information for the m uncoded bits designated by the m bit sliding window by calculating the slope squared for the m uncoded bits.

The controller 404 provides the timing information for the m uncoded bits to the low pass filter 408, such as a finite impulse response filter or an infinite impulse response filter. The low pass filter 408 averages the timing information for the sets of m uncoded bits over the bit length L. The comparator 410 sets a timing flag if the average timing information provided by the low pass filter 408 is less than the threshold, and the controller 404 replaces the next symbol in the register 402 with a replacement symbol in response to the timing flag.

The controller 404 maintains a running count of how many times the replacement bits are injected into the data block as more uncoded bits in the data block are loaded into the register 402, encoded into encoded bits (if necessary) and then transferred from the register 402 to the transducer 106 for writing to the disk 104. If the controller 404 detects that the running count has exceeded a permissible value, the controller 404 sets a reseed flag indicating that a new randomizer (scrambler) seed and a rewrite of the data block are necessary. The controller 404 can either set the reseed flag or replace the selected bits with the replacement bits in response to the timing flag.

Figure 5:
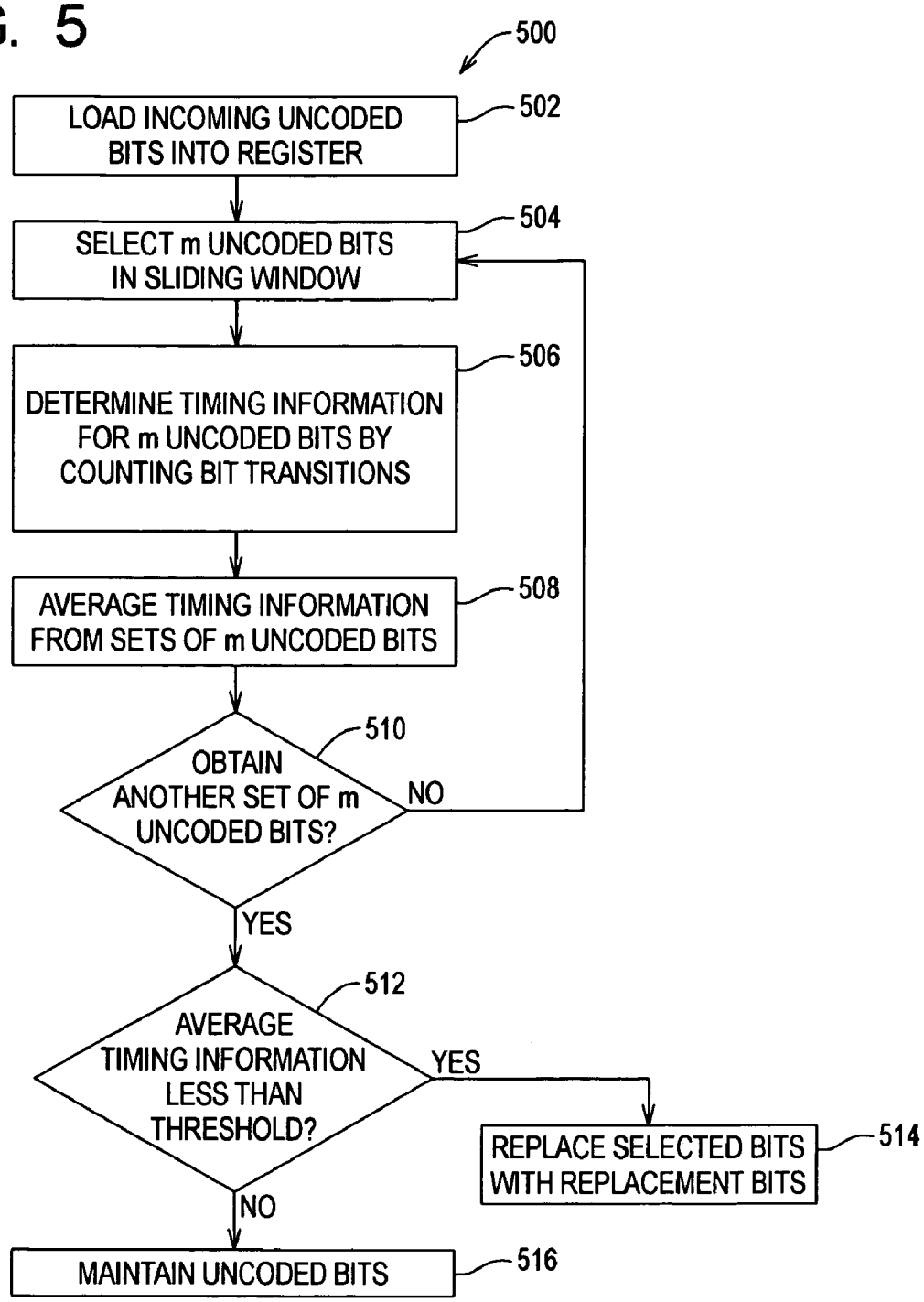
FIG. 5 shows flowchart for encoding uncoded bits as a function of the number of bit transitions in the uncoded bits.

FIG. 5 shows a flowchart 500 for encoding the uncoded bits as a function of the number of bit transitions in the uncoded bits. The flowcharts 300 and 500 are similar except for the manner in which the timing information is calculated. Accordingly, details set forth for the flowchart 300 that are pertinent to the flowchart 500 need not be repeated.

The incoming uncoded bits are loaded into a bit register (step 502) and a sliding window selects m uncoded bits in the bit register (step 504). Timing information for the m uncoded bits designated by the sliding window is determined by counting the number of bit transitions in the m uncoded bits (step 506). A counter is incremented every time a bit transition is detected in the m uncoded bits. The sum is a measure of the Hamming weight, or the number of 1's, in the m uncoded bits, and therefore a measure of the timing information in the m uncoded bits.

Once the timing information for the m uncoded bits is obtained, the timing information is averaged with timing information obtained from previous sets of m uncoded bits (step 508). It is next determined whether another set of m uncoded bits can be obtained (step 510). If so, steps 504 to 508 are repeated. Once the average timing information for all sets of m uncoded bits is obtained, it is determined whether the average timing information is less than a threshold based on the minimum bit transition requirement (step 512). If so, the replacement bits replace the selected bits (step 514), otherwise the uncoded bits are maintained (step 516).

Figure 6:
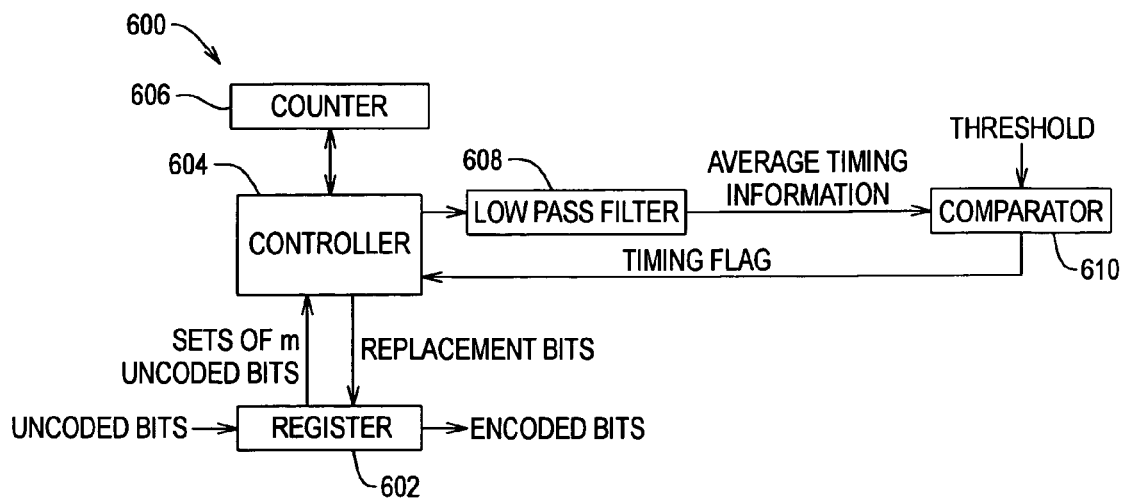
FIG. 6 shows an encoder for FIG. 5.

FIG. 6 shows an encoder 600 that implements the flowchart 500. The encoders 400 and 600 similar except for the manner in which the timing information is calculated. Accordingly, details set forth for the encoder 400 that are pertinent to the encoder 600 need not be repeated.

The encoder 600 includes a register 602, a controller 604, a counter 606, a low pass filter 608 and a comparator 610. The register 602 has a bit length L of one-hundred, and the uncoded bits are loaded into the register 602 m uncoded bits at a time. The controller 604 detects the bit transitions in the m uncoded bits, increments the counter 606 every time a bit transition is detected and retrieves the sum from the counter 606 after the m uncoded bits are analyzed for bit transitions. The controller 604 determines the timing information for the m uncoded bits designated by the m bit sliding window by counting the bit transitions in the m uncoded bits.

The controller 604 provides the timing information for the m uncoded bits to the low pass filter 608, which averages the timing information for the sets of m uncoded bits over the bit length L, the comparator 610 sets a timing flag if the average timing information provided by the low pass filter 608 is less than the threshold, and the controller 604 replaces the next symbol in the register 602 with a replacement symbol in response to the timing flag.

User data can be quite repetitive due to a large number of consecutive, repeated bytes, or consecutive, repeated multiple byte words. Bit map data is especially repetitive on a byte-by-byte, or word-by-word (multiple byte word) basis.

Although a statistical rarity, repetitive user data might force the replacement bits to inject an excessive number of errors into the data block. In addition, a user might create a stress test that forces the replacement bits to inject an excessive number of errors into the data block.

Randomizing the uncoded bits reduces the likelihood that the uncoded bits contain a long string of consecutive 0's or 1's, thereby increasing the timing information in the uncoded bits, reducing the number of times the replacement bits replace the selected bits, reducing the number of errors the replacement bits inject into the data block, reducing the number of encoded bits and increasing the number of uncoded bits which are maintained.

Figure 7:
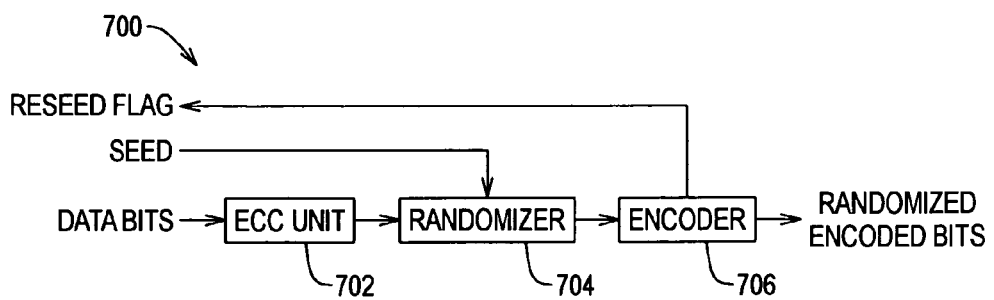
FIG. 7 shows an architecture for randomizing and encoding a bit stream.
Figure 8:
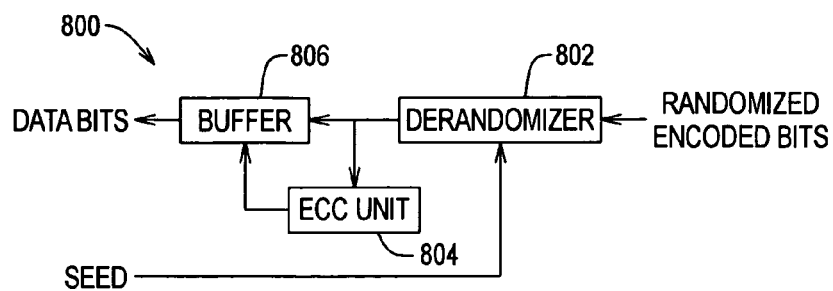
FIG. 8 shows an architecture for derandomizing and decoding a bit stream.

FIG. 7 shows an architecture 700 for randomizing and encoding a bit stream, and FIG. 8 shows an architecture 800 for derandomizing and decoding a bit stream.

The architecture 700 includes an ECC unit 702, a randomizer 704 and an encoder 706, and the architecture 800 includes a derandomizer 802, an ECC unit 804 and a buffer 806.

The data bits are provided to the ECC unit 702 (such as the ECC unit 116), and the ECC unit 702 provides the uncoded bits to the randomizer 704.

The randomizer 704 randomizes the uncoded bits, thereby converting the uncoded bits into randomized uncoded bits. The randomizer 704 removes repetitions from the uncoded bits by uncorrelating the uncoded bits so that the uncoded bits are less likely to contain a long string of consecutive 0's or 1's. As a result, the randomizer 704 reduces the number of times the replacement bits are injected into the data block. The randomizer 704 is a Galois field randomizer selected using typical computer data on a trial-and-error basis.

The randomizer 704 initially randomizes the uncoded bits using a default seed, and a controller (such as the controller 404) maintains a running count of how many times the replacement bits are injected into the data block. If the running count exceeds a permissible value, the encoder 706 sets a reseed flag, and as a result, the default seed is replaced by an alternate seed and the data block is rerandomized, reencoded and rewritten to the disk 104. This process can repeat until the number of intentionally-introduced errors injected by the replacement bits into the data block is within a predetermined maximum.

The randomizer 704 provides the randomized uncoded bits to the encoder 706 (such as the encoder 400), and the randomized encoded bits from the encoder 706 are written to the disk 104.

The derandomizer 802 derandomizes the randomized encoded bits read from the disk 104, thereby returning the encoded bits to their original derandomized form. The derandomizer 802 derandomizes the randomized encoded bits using the seed which the randomizer 704 used to randomized the uncoded bits.

The disk drive 100 provides the derandomizer 802 with the correct seed as follows: (1) maintain a log of data sectors on the disk 104 that require an alternate seed along with the alternate seed finally used for each data sector, (2) read the data sectors using the default seed, (3) if a data sector cannot be read, check the log to determine if the data sector requires an alternate seed, (4) if the data sector is in the log, reread the data sector with the correct seed, and (5) if the data sector still cannot be read, use other error recovery procedures. The log is updated as necessary, such as when a newly written data sector requires an alternate seed or a data sector is rewritten. The log is permanently retained on the disk 104 or in non-volatile, memory. Furthermore, since the log is frequently accessed and scanned, the number of log entries is very small (usually zero) and the log is initially accessible by the disk controller 124 from fast, volatile memory.

Alternatively, rather than maintaining the log, the disk drive 100 reads the data sector using the default seed, and if the data sector cannot be read then the data sector is reread and derandomized using alternate seeds in succession until an alternate seed is found that permits the data sector to be read.

The derandomized encoded bits are then decoded by the ECC unit 804 (such as the ECC unit 116) and the data bits recovered from the derandomized encoded bits are loaded into the buffer 806.

A suitable randomizer and derandomizer are described in commonly assigned U.S. Pat. No. 6,587,977 which is incorporated by reference in its entirety.

The sliding window accumulates timing information for m uncoded bits at a time over the uncoded bits. Even if a particular set of m uncoded bits has essentially no timing information, the m uncoded bits are not necessarily selected bits. Instead, the uncoded bits that surround the m uncoded bits may provide sufficient timing information to compensate for the insufficient timing information in the m uncoded bits. For example, even if 15 to 20 uncoded bits do not provide sufficient timing information, the replacement bits may not be necessary if the surrounding uncoded bits (before and/or after the 15 to 20 uncoded bits) provide enough timing information that the average timing information meets the threshold.

Profiling can be used so that more timing information is provided in the encoded bits where it is more important. That is, the threshold (or minimum bit transition requirement) can be determined and lowered in a wide variety of ways so that the replacement bits are determined and injected more efficiently.

The threshold can be pre-programmed to be lowered at a location in a data block to inject the replacement bits at more efficient locations. During a read operation, timing errors cause the timing loop to lose phase lock on the bits being read from the disk 104. For example, the timing loop samples the read signal one cell off (by sampling cells 499 and 500 instead of cells 500 and 501) and slips one bit, the timing loop loses one bit or the timing loop samples one bit twice. As a result, the ECC unit 116 is rendered inoperative since it cannot determine the beginning and end of the ECC symbols. The timing errors typically occur during the first portion of the data block (read from a data sector on the disk 104) when the timing loop is acquiring phase lock on the data block before convergence. Likewise, the timing errors diminish towards the end of the data block.

The threshold can be set at a higher value near the beginning of the data block and a lower value near the end of the data block. For example, the threshold can have a first value for about the first 1000 to 2000 uncoded bits in the data block and a second lower value for the remaining uncoded bits in the data block. The threshold can also be adaptive and selected from different values as the data block is written.

The threshold can be a continuous function that is different for every symbol and eventually decreases to a steady state. The threshold can also be selected for transducer/disk pairings and for recording zones on the disk.

A pre-coder $(1/(1+D^2))$ (where D represents delay) changes 1's and 0's in the encoded bits written to the disk 104 by the transducer 106 into magnetic-polarity transitions and no magnetic-polarity transitions, respectively, that are recorded on the disk 104. Likewise, a post-coder $(1+D^2)$ changes magnetic-polarity transitions and no magnetic-polarity transitions read from the disk 104 by the transducer 106 into 1's and 0's, respectively, in the encoded bits retrieved from the disk 104. It is understood that the encoded bits (and the maintained uncoded bits) are written to and read from the disk 104 regardless of the pre-coding and post-coding operations.

Bit length converters can be inserted before and after the ECC unit as necessary to package the incoming bits into a proper bit length for the ECC computations and then repackage the outgoing bits into the original bit length. ECC bit length conversion is described in the '977 patent.

The data bits can consist of user data sent from the host computer, or alternatively, include the user data and additional information such as cyclic redundancy (CRC) bits appended thereto. Thus, the term "data bits" as used herein includes user data and optionally additional information. Furthermore, the data symbols, the ECC symbols, the selected symbols and the replacement symbols can have various bit lengths and are not limited to bit lengths of ten. Likewise, the uncoded bits can have various bit lengths besides one-hundred, and consecutive sequences of the uncoded bits in a data block can be encoded and decoded. For example, an L bit sliding window can designate a first set of L uncoded bits for encoding, then a second set of L uncoded bits for encoding, and so on until the entire data block is encoded L uncoded bits at a time.

The terms "encoding" and "decoding" are used herein are specific to the present invention. Indeed, a separate decoder is unnecessary since the ECC computation on the bits read from the disk 104 serves to identify and correct errors in the bits, as is conventional, thereby correcting the injected errors and decoding the encoded bits into the uncoded bits.

In addition to the logic blocks shown in the drawings, the various methods and architectures described herein can be implemented as computer instructions for execution by a microprocessor, ASICs, logic circuits, etc. Although the present invention as been described for data storage and retrieval in a disk drive, the present invention is useful with other data storage devices such as tape drives and with digital data transmission.

The present invention has been described in considerable detail with reference to certain preferred versions thereof, however other versions are possible. Therefore, the spirit and scope of the appended claims should not be limited to the description of the preferred versions contained herein.

What is claimed is:

1. A method for encoding a bit stream to meet a minimum bit transition requirement, comprising the steps of:
    providing uncoded bits;
    determining whether the uncoded bits meet the minimum bit transition requirement; and
    replacing selected bits in the uncoded bits with replacement bits that meet the minimum bit transition requirement if the uncoded bits do not meet the minimum bit transition requirement, thereby encoding the uncoded bits into encoded bits that meet the minimum bit transition requirement, wherein the replacement bits invert at least two of the selected bits, and the selected bits and the replacement bits have the same bit length which is less than the bit length of the uncoded bits.

2. The method of claim 1, wherein the selected bits are consecutive bits.

3. The method of claim 2, wherein the uncoded bits exceed a maximum run length limitation.

4. The method of claim 2, including maintaining the uncoded bits that meet the minimum bit transition requirement even though the uncoded bits exceed a maximum run length limitation.

5. The method of claim 1, including storing the encoded bits as magnetic-polarity transitions on a disk.

6. The method of claim 5, including reading the magnetic-polarity transitions from the disk to retrieve the encoded bits.

7. The method of claim 6, including replacing the replacement bits in the encoded bits read from the disk with the selected bits based on an ECC computation performed on the encoded bits read from the disk, thereby decoding the encoded bits into the uncoded bits.

8. The method of claim 7, including sending data bits in the uncoded bits decoded from the encoded bits to a host computer.

9. The method of claim 8, wherein the replacement bits inject errors into the uncoded bits that increase timing information in the uncoded bits such that the encoded bits have sufficient timing information for phase locking on the encoded bits as the encoded bits are read from the disk regardless of whether the encoded bits exceed a maximum run length limitation.

10. A method for encoding a bit stream to meet a minimum bit transition requirement, comprising the steps of:
    providing uncoded bits;
    analyzing the uncoded bits by:
        determining a first value based on first bit transitions in the uncoded bits;
        determining a second value based on second bit transitions in the uncoded bits;
        generating a combination value as a function of the first and second values; and
        determining whether the combination value meets the minimum bit transition requirement; and
    replacing selected bits in the uncoded bits with replacement bits that meet the minimum bit transition requirement if the combination value fails to meet the minimum bit transition requirement, thereby encoding the uncoded bits into encoded bits that meet the minimum bit transition requirement, wherein the replacement bits invert at least two of the selected bits, and the selected bits and the replacement bits have the same bit length which is less than the bit length of the uncoded bits.

11. The method of claim 10, including generating the combination value by averaging values that include the first and second values.

12. The method of claim 10, wherein the first value is based on a first set of m uncoded bits that includes the first bit transitions and is designated by a sliding window of m bits, and the second value is based on a second set of m uncoded bits that includes the second bit transitions and is designated by the sliding window.

13. The method of claim 10, wherein the first value is based on the number of the first bit transitions, and the second value is based on the number of the second bit transitions.

14. The method of claim 10, wherein step the first value is a function of the slope of a waveform based on the first bit transitions, and the second value is a function of the slope of a waveform based on the second bit transitions.

15. The method of claim 10, wherein the first value is a function of the slope squared of a waveform based on the first bit transitions, and the second value is a function of the slope squared of a waveform based on the second bit transitions.

16. The method of claim 15, wherein the slope squared of each waveform corresponds to the amount of timing information in the waveform.

17. The method of claim 10, including storing the encoded bits magnetic-polarity transitions on a disk.

18. The method of claim 17, including reading the magnetic-polarity transitions from the disk to retrieve the encoded bits.

19. The method of claim 18, including replacing the replacement bits in the encoded bits read from the disk with the selected bits based on an ECC computation performed on the encoded bits read from the disk, thereby decoding the encoded bits into the uncoded bits.

20. The method of claim 19, including sending data bits in the uncoded bits decoded from the encoded bits to a host computer.

21. The method of claim 20, wherein the replacement bits inject errors into the uncoded bits that increase timing information in the uncoded bits such that the encoded bits have sufficient timing information for phase locking on the encoded bits as the encoded bits are read from the disk regardless of whether the encoded bits exceed a maximum run length limitation.

22. A method for encoding a bit stream to meet a minimum bit transition requirement, comprising the steps of:
providing uncoded bits;
analyzing the uncoded bits by:
establishing a sliding window for m uncoded bits;
accumulating a moving sum based on the bit transitions in each set of m uncoded bits designated by the sliding window; and
comparing the moving sum to a threshold based on the minimum bit transition requirement; and
replacing selected bits in the uncoded bits with replacement bits that meet the minimum bit transition requirement if the moving sum fails to meet the threshold, thereby encoding the uncoded bits into encoded bits that meet the minimum bit transition requirement, wherein the replacement bits invert at least two of the selected bits, and the selected bits and the replacement bits have the same bit length which is less than the bit length of the uncoded bits.

23. The method of claim 22, including replacing more than m uncoded bits with the replacement bits.

24. The method of claim 22, including accumulating the moving sum of the slope squared of a waveform based on each set of m uncoded bits, wherein the slope squared is a function of the bit transitions in the waveform.

25. The method of claim 24, including determining the slope squared for a set of m consecutive bits includes the steps of determining the slope of the waveform and generating the square of the slope.

26. The method of claim 24, wherein determining the slope includes differentiating the waveform.

27. The method of claim 24, wherein determining the slope squared includes accessing a look-up table that includes a corresponding slope squared for each m uncoded bit sequence.

28. The method of claim 24, wherein the slope squared is quantized to two levels.

29. The method of claim 22, including storing the encoded bits, as magnetic-polarity transitions on a disk.

30. The method of claim 29, including reading the magnetic-polarity transitions from the disk to retrieve the encoded bits.

31. The method of claim 30, including replacing the replacement bits in the encoded bits read from the disk with the selected bits based on an ECC computation performed on the encoded bits read from the disk, thereby decoding the encoded bits into the uncoded bits.

32. The method of claim 31, including sending data bits in the uncoded bits decoded from the encoded bits to a host computer.

33. The method of claim 32, wherein the replacement bits inject errors into the uncoded bits that increase timing information in the uncoded bits such that the encoded bits have sufficient timing information for phase locking on the encoded bits as the encoded bits are read from the disk regardless of whether the encoded bits exceed a maximum run length limitation.

34. The method of claim 22, including accumulating the moving sum of the number of bit transitions in each set of m uncoded bits.

35. The method of claim 34, including replacing more than m uncoded bits with the replacement bits.

36. A method for encoding a bit stream to meet a minimum bit transition requirement, comprising the steps of:
providing data bits;
performing an ECC computation on the data bits to generate ECC bits;
forming uncoded bits that include the data bits and the ECC bits;
randomizing the uncoded bits;
determining whether the randomized uncoded bits meet the minimum bit transition requirement; and
replacing selected bits in the randomized uncoded bits with replacement bits that meet the minimum bit transition requirement if the randomized uncoded bits do not meet the minimum bit transition requirement, thereby encoding the randomized uncoded bits into randomized encoded bits that meet the minimum bit transition requirement, wherein the replacement bits invert at least two of the selected bits, and the selected bits and the replacement bits have the same bit length which is less than the bit length of the uncoded bits.

37. The method of claim 36, including the repeating the method and storing a number of replacements by counting the number of times that the replacements bits replace the selected bits.

38. The method of claim 37, including performing the randomizing using a seed.

39. The method of claim 38 wherein the seed is a default seed.

40. The method of claim 39, including performing the randomizing using another seed instead of the default seed if the number of replacements exceeds a predetermined value.

41. The method of claim 37, including counting the number of replacements per data sector on a disk.

42. The method of claim 36, wherein the randomizing is Galois field randomizing.

43. The method of claim 36, including storing the randomized encoded bits as magnetic-polarity transitions on a disk.

44. The method of claim 43, including reading the magnetic-polarity transitions from the disk to retrieve the randomized encoded bits.

45. The method of claim 44, including derandomizing the randomized encoded bits read from the disk.

46. The method of claim 45, including replacing the replacement bits in the derandomized encoded bits with the selected bits based on an ECC computation performed on the derandomized encoded bits, thereby decoding the encoded bits into the uncoded bits.

47. The method of claim 46, including sending the data bits in the uncoded bits decoded from the encoded bits to a host computer.

48. The method of claim 44, including derandomizing the randomized encoded bits read from the disk using a default seed.

49. The method of claim 48, including derandomizing the randomized encoded bits read from the disk using a different seed than the default seed.

50. A data storage device for storing data on storage media and retrieving data from the storage media, comprising:
a buffer for storing uncoded bits that include data bits and ECC bits; and
a controller that encodes the uncoded bits to meet a minimum bit transition requirement, wherein the controller determines whether the uncoded bits meet the minimum bit transition requirement, and the controller replaces selected bits in the uncoded bits with replacement bits that meet the minimum bit transition requirement if the uncoded bits do not meet the minimum bit transition requirement, thereby encoding the uncoded bits into encoded bits that meet the minimum bit transition requirement, wherein the replacement bits invert at least two of the selected bits, and the selected bits and the replacement bits have the same bit length which is less than the bit length of the uncoded bits.

51. The data storage device of claim 50, wherein the selected bits are consecutive bits.

52. The data storage device of claim 51, wherein the controller determines whether the uncoded bits meet the minimum bit transition requirement even though the uncoded bits exceed a maximum run length limitation.

53. The data storage device of claim 51, wherein the controller maintains the uncoded bits if the uncoded bits meet the minimum bit transition requirement even though the uncoded bits exceed a maximum run length limitation.

54. The data storage device of claim 50, wherein the controller stores the encoded bits as magnetic-polarity transitions on the storage media.

55. The data storage device of claim 54, wherein upon read back of the magnetic-polarity transitions from the storage media the controller retrieves the encoded bits.

56. The data storage device of claim 55, wherein the controller replaces the replacement bits in the encoded bits read from the storage media with the selected bits based on an ECC computation performed on the encoded bits read from the storage media, thereby decoding the encoded bits into the uncoded bits.

57. The data storage device of claim 56, wherein the controller sends the data bits in the uncoded bits decoded from the encoded bits to a host computer.

58. The data storage device of claim 57, wherein the replacement bits inject errors into the uncoded bits that increase timing information in the uncoded bits such that the encoded bits have sufficient timing information for phase locking on the encoded bits as the encoded bits are read from the storage media regardless of whether the encoded bits exceed a maximum run length limitation.

59. The data storage device of claim 50, wherein the controller (i) determines a first value based on first bit transitions in the uncoded bits, (ii) determines a second value based on second bit transitions in the uncoded bits, (iii) generates a combination value as a function the first and second values, (iv) determines whether the combination value meets the minimum bit transition requirement, and (v) replaces the selected said first and/or second number of bits with the replacement bits if the combination value fails to meet the minimum bit transition requirement.

60. The data storage device of claim 59, wherein the controller generates the combination value by averaging values that include the first and second values.

61. The data storage device of claim 59, wherein the controller determines the first value based on a first set of m uncoded bits that includes the first bit transitions and is designated by a sliding window of m bits, and determines the second value based on a second set of m uncoded bits that includes the second bit transitions and is designated by the sliding window.

62. The data storage device of claim 59, wherein the controller determines the first value based on the number of the first bit transitions, and determines the second value based on the number of the second bit transitions.

63. The data storage device of claim 59, wherein the controller determines the first value as function of the slope of a waveform based on the first bit transitions, and determines the second value as a function of the slope of a waveform based on the second bit transitions.

64. The data storage device of claim 59, wherein the controller determines the first value as a function of the slope squared of a waveform based on the first bit transitions, and determines the second value as a function of the slope squared of a waveform based on the second bit transitions.

65. The data storage device of claim 50, wherein the controller (i) obtains the uncoded bits, (ii) establishes a sliding window for m uncoded bits, (iii) accumulates a moving sum of values based on the bit transitions in each set of m uncoded bits, (iv) compares the moving sum to a threshold based on the minimum bit transition requirement, and (v) replaces the selected bits with the replacement bits if the moving sum fails to meet the threshold.

66. The data storage device of claim 65, wherein the replacement bits are more than m bits.

67. The data storage device of claim 65, wherein the moving sum is the slope squared of a waveform based on each set of m bits.

68. The data storage device of claim 67, wherein the controller determines the slope squared by determining the slope of the waveform and generating the square of the slope.

69. The data storage device of claim 67, wherein the controller determines the slope by differentiating the waveform.

70. The data storage device of claim 67, wherein the controller determines the slope squared by accessing a look-up table that includes a corresponding sloped squared for each m bit sequence.

71. A method for encoding and decoding a bit stream in a disk drive that includes a disk, the method comprising the following steps in the sequence set forth:
providing uncoded bits that include data bits and ECC bits;
determining whether the uncoded bits meet a minimum bit transition requirement;
replacing selected bits in the uncoded bits with replacement bits that meet the minimum bit transition requirement if the uncoded bits do not meet the minimum bit transition requirement, thereby encoding the uncoded bits into encoded bits that meet the minimum bit transition requirement, wherein the replacement bits invert at least two of the selected bits, and the selected bits and the replacement bits have the same bit length which is less than the bit length of the uncoded bits;
storing the encoded bits on the disk;
reading the encoded bits from the disk;
generating the selected bits using an ECC computation performed on the encoded bits read from the disk; and
replacing the replacement bits in the encoded bits read from the disk with the generated selected bits, thereby decoding the encoded bits into the uncoded bits.

72. The method of claim 71, wherein the data bits are arranged as data symbols, the ECC bits are arranged as ECC symbols, and the uncoded bits include the data symbols and the ECC symbols.

73. The method of claim 72, wherein the selected bits are a selected symbol from the data symbols and the ECC symbols, and the replacement bits replace the selected symbol.

74. The method of claim 73, wherein the selected symbol is a data symbol.

75. The method of claim 73, wherein the selected symbol is an ECC symbol.

76. The method of claim 71, wherein the selected bits are consecutive bits.

77. The method of claim 71, wherein the replacement bits are predetermined.

78. The method of claim 71, wherein the replacement bits are not based on the uncoded bits.

79. The method of claim 71, wherein the replacement bits inject errors into the uncoded bits.

80. The method of claim 71, wherein the replacement bits increase timing information in the uncoded bits.

81. The method of claim 71, wherein the replacement bits inject errors into the uncoded bits that increase timing information in the uncoded bits.

82. The method of claim 71, wherein the replacement bits inject errors into the uncoded bits that increase timing information in the uncoded bits such that the encoded bits have sufficient timing information regardless of whether the encoded bits exceed a maximum run length limitation.

83. The method of claim 71, wherein the replacement bits inject errors into the uncoded bits that increase timing information in the uncoded bits such that the encoded bits have sufficient timing information for phase locking on the encoded bits as the encoded bits are read from the disk regardless of whether the encoded bits exceed a maximum run length limitation.

84. The method of claim 71, wherein the replacement bits improve phase locking on the encoded bits as the encoded bits are read from the disk.

85. The method of claim 71, wherein the replacement bits are alternating pairs of 1's and 0's.

86. The method of claim 85, wherein the replacement bits are 0011001100.

87. The method of claim 85, wherein the replacement bits are 1100110011.

88. The method of claim 71, wherein the minimum bit transition requirement is a function of the location of the uncoded bits in a data block.

89. The method of claim 88, wherein the minimum bit transition requirement is more difficult at the beginning of the data block that at the end of the data block.

90. The method of claim 89, wherein the minimum bit transition requirement is more difficult at about the first 1000 to 2000 uncoded bits in the data block than at the remaining uncoded bits in the data block.

91. The method of claim 88, wherein the minimum bit transition requirement is adaptive and selected as the data block is written to the disk.

92. The method of claim 71, wherein the minimum bit transition requirement is a function of the disk and a transducer that reads from and writes to the disk.

93. The method of claim 71, wherein the minimum bit transition requirement is a function of recording zones on the disk.

94. The method of claim 71, wherein determining whether the uncoded bits meet the minimum bit transition requirement includes:
sampling m uncoded bits using an m bit sliding window to obtain sets of m uncoded bits;
obtaining values from the sets of m uncoded bits, wherein each obtained value is obtained from a corresponding set of m uncoded bits;
determining a combination value based on the obtained values; and
comparing the combination value with a threshold.

95. The method of claim 94, wherein the combination value is a moving average of the obtained values.

96. The method of claim 95, wherein each obtained value is based on the number of bit transitions in the corresponding set of m uncoded bits.

97. The method of claim 95, wherein each obtained value is based on the slope of a waveform derived from the corresponding set of m uncoded bits.

98. The method of claim 95, wherein each obtained value is based on the slope squared of a waveform derived from the corresponding set of m uncoded bits.

99. The method of claim 71, including:
randomizing the uncoded bits;
encoding the randomized uncoded bits;
storing the randomized encoded bits on the disk;
reading the randomized encoded bits from the disk; and
derandomizing the randomized encoded bits read from the disk to provide the encoded bits.

100. The method of claim 71, including:
receiving the data bits from a host computer; then
providing the uncoded bits; and then
sending the data bits in the uncoded bits decoded from the encoded bits to the host computer.

101. A method for encoding and decoding a bit stream in a disk drive that includes a disk, the method comprising the following steps in the sequence set forth:
providing uncoded bits that include data bits and ECC bits;
determining whether the uncoded bits meet a minimum bit transition requirement;
replacing selected bits in the uncoded bits with replacement bits that meet the minimum bit transition requirement if the uncoded bits do not meet the minimum bit transition requirement, thereby encoding the uncoded bits into encoded bits that meet the minimum bit transition requirement, wherein the replacement bits invert at least two of the selected bits to inject errors into the uncoded bits that increase timing information in the uncoded bits, and the selected bits and the replacement bits have the same bit length which is less than the bit length of the uncoded bits;
storing the encoded bits on the disk;
reading the encoded bits from the disk, wherein the replacement bits improve phase locking on the encoded bits as the encoded bits are read from the disk due to the increased timing information in the encoded bits;
generating the selected bits using an ECC computation performed on the encoded bits read from the disk; and
replacing the replacement bits in the encoded bits read from the disk with the generated selected bits, thereby decoding the encoded bits into the uncoded bits.

102. The method of claim 101, wherein the replacement bits are predetermined.

103. The method of claim 101, wherein the minimum bit transition requirement is a function of the location of the uncoded bits in a data block.

104. The method of claim 103, wherein the minimum bit transition requirement is more difficult at the beginning of the data block than at the end of the data block.

105. The method of claim 101, wherein determining whether the uncoded bits meet the minimum bit transition requirement includes:
sampling m uncoded bits using an m bit sliding window to obtain sets of m uncoded bits;
obtaining values from the sets of m uncoded bits, wherein each obtained value is obtained from a corresponding set of m uncoded bits;
determining a combination value based on the obtained values; and
comparing the combination value with a threshold.

106. The method of claim 105, wherein the combination value is a moving average of the obtained values.

107. The method of claim 106, wherein each obtained value is based on the slope of a waveform derived from the corresponding set of m uncoded bits.

108. The method of claim 106, wherein each obtained value is based on the slope squared of a waveform derived from the corresponding set of m uncoded bits.

109. The method of claim 101, including:
randomizing the uncoded bits;
encoding the randomized uncoded bits;
storing the randomized encoded bits on the disk;
reading the randomized encoded bits from the disk; and
derandomizing the randomized encoded bits read from the disk to provide the encoded bits.

110. The method of claim 101, including:
receiving the data bits from a host computer; then
providing the uncoded bits; and then
sending the data bits in the uncoded bits decoded from the encoded bits to the host computer.

111. A method for encoding and decoding a bit stream in a disk drive that includes a disk, the method comprising the following steps in the sequence set forth:
providing uncoded bits that include data bits and ECC bits, wherein the data bits are arranged as data symbols, the ECC bits are arranged as ECC symbols, and the uncoded bits include the data symbols and the ECC symbols;
determining whether the uncoded bits meet a minimum bit transition requirement;
replacing selected bits in the uncoded bits with replacement bits that meet the minimum bit transition requirement if the uncoded bits do not meet the minimum bit transition requirement, thereby encoding the uncoded bits into encoded bits that meet the minimum bit transition requirement, wherein the selected bits are a selected symbol from the data symbols and the ECC symbols, the replacement bits invert at least two of the selected bits to inject errors into the uncoded bits that increase timing information in the uncoded bits, and the selected bits and the replacement bits have the same bit length which is less than the bit length of the uncoded bits;
storing the encoded bits on the disk;
reading the encoded bits from the disk, wherein the replacement bits improve phase locking on the encoded bits as the encoded bits are read from the disk due to the increased timing information in the encoded bits;
generating the selected bits using an ECC computation on the encoded bits read from the disk; and
replacing the replacement bits in the encoded bits read from the disk with the generated selected bits, thereby decoding the encoded bits into the uncoded bits.

112. The method of claim 111, wherein the replacement bits are predetermined.

113. The method of claim 111, wherein the minimum bit transition requirement is a function of the location of the uncoded bits in a data block.

114. The method of claim 113, wherein the minimum bit transition requirement is more difficult at the beginning of the data block than at the end of the data block.

115. The method of claim 111, wherein determining whether the uncoded bits meet the minimum bit transition requirement includes:
sampling m uncoded bits using an m bit sliding window to obtain sets of m uncoded bits;
obtaining values from the sets of m uncoded bits, wherein each obtained value is obtained from a corresponding set of m uncoded bits;
determining a combination value based on the obtained values; and
comparing the combination value with a threshold.

116. The method of claim 115, wherein the combination value is a moving average of the obtained values.

117. The method of claim 116, wherein each obtained value is based on the slope of a waveform derived from the corresponding set of m uncoded bits.

118. The method of claim 116, wherein each obtained value is based on the slope squared of a waveform derived from the corresponding set of m uncoded bits.

119. The method of claim 111, including:
randomizing the uncoded bits;
encoding the randomized uncoded bits;
storing the randomized encoded bits on the disk;
reading the randomized encoded bits from the disk; and
derandomizing the randomized encoded bits read from the disk to provide the encoded bits.

120. The method of claim 111, including:
receiving the data bits from a host computer; then
providing the uncoded bits; and then
sending the data bits in the uncoded bits decoded from the encoded bits to the host computer.

* * * * *